Jan. 7, 1941.   A. T. FALTISEK   2,227,638
TRACTOR LUG
Filed March 2, 1939
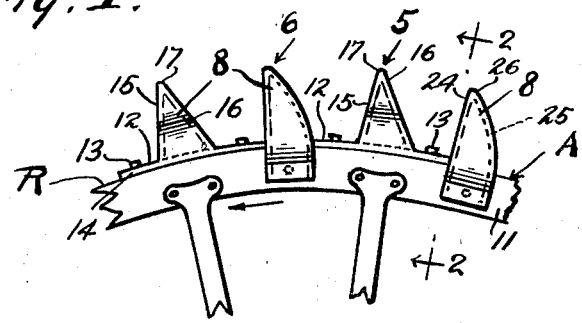
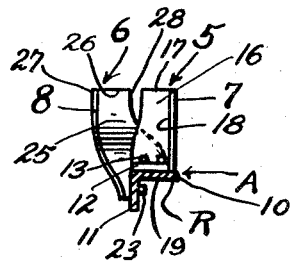
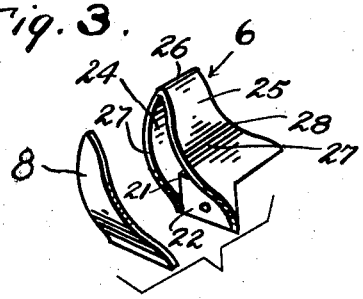
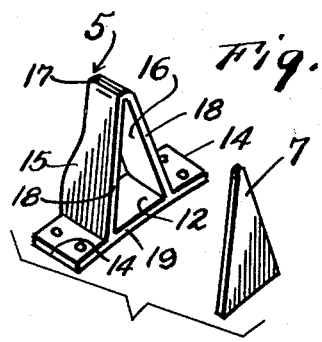
Inventor
Andrew T. Faltisek
By L. B. James
Attorney

Patented Jan. 7, 1941

2,227,638

UNITED STATES PATENT OFFICE 2,227,638

TRACTOR LUG

Andrew Theodor Faltisek, Rowena, Tex.

Application March 2, 1939, Serial No. 259,437

2 Claims. (Cl. 301—44)

This invention relates to tractor wheel lugs and more particularly that type having an open side.

The primary object of this invention resides in the provision of a hollow tractor wheel lug adapted to be closed by a cover-plate so as to prevent the same from picking up dirt and throwing it on the tractor and operator thereof.

Another object of this invention resides in the provision of a hollow tractor wheel lug having an open side covered by a particularly constructed cover-plate.

With these and other objects in view, this invention resides in certain novel features of construction and arrangement of parts to be hereinafter more particularly set forth in the specification, illustrated in the accompanying drawing and pointed out in the appended claims and, while this disclosure depicts my present conception of the invention, the right is reserved to resort to such changes in arrangement and construction as come within the scope of the claims.

In the accompanying drawing forming a part of this application:

Fig. 1 is an outside view of a portion of a tractor wheel showing the lugs as constructed in accordance with this invention.

Fig. 2 is a sectional view thereof approximately on line 2—2 of Fig. 1.

Fig. 3 is a detail perspective view of an outside tractor wheel lug and cover plate in juxta-position.

Fig. 4 is a similar view of an inside tractor wheel lug.

Fig. 5 is a plan view of part of the wheel and lugs.

In the embodiment of the invention shown in the drawing there is provided a tractor wheel indicated in general at A and having a rim R of angle iron forming a cylinder only a segment of which is here shown. The other leg 11 of the angle iron extends inwardly of the wheel from the leg 10 and at the outer edge thereof.

On the rim R are mounted alternately arranged and cooperating inner traction lugs 5 and outer traction lugs 6. Each of the traction lugs 5 comprises a base plate 12 of slightly less width than the leg 10 and longitudinally curved to conform to the curvature of the leg 10. Rivets 13 serve to secure the base plates 12 to the rim leg 10 in such manner that spaces are left between the ends 14 of adjacent plates for purposes which will be presently explained. Extending outwardly from each plate 12 in spaced relation to the ends thereof is a pair of lug walls 15 and 16 which are united at their outer ends as at 17 to form a wedge shaped structure. The wall 15 constitutes the forward wall of the lug since that wall first engages the ground upon the wheel rotating in the direction of the arrow shown in Fig. 1 and the interior angle between the wall 15 and the base is less than the interior angle between the rear wall 16 and the base. This causes the front wall 15 to have an efficient pushing effect against the engaged ground while the wall 16 is highly efficient as a brace to resist bending or fracture of the wall 15. The outer edges 18 of the walls 15 and 16 are perpendicular to the transverse sections of the base 12 as their junctions therewith and are flush with the outer edge 19 of said base. The inner edges 20 of the walls 15 and 16 are reversely curved in such manner that the edge 17 of the lug is shorter than the width of the base 12. A triangular plate 7 is welded or otherwise secured to the edges 18 and 19 of the walls 15 and 16 and base 12 and thus closes the outer end of the hollow lug.

Each outer lug 6 has an angled base portion one leg 21 of which extends transversely on the rim leg 10 and fits between adjacent bases 12 of the inner lugs 5. The leg 21 is, as shown in Fig. 2, of equal width with the base 12. The other leg 22 of the outer lug base lies flat against the leg 11 of the wheel rim and is there secured by a rivet 23. The outer lug 6 has a front wall 24 extending from the front edge of the base and at right angles to said base. The outer leg also has a rear wall 25 extending outwardly from the rear end of the base and arcuately curved to meet the front wall 24 at an edge 25. The outer edges 27 of the walls 24 and 25 extend down to the bottom of the leg 22 and are reversely curved so that the outer end of the edge 26 is offset well to the outside of the wheel rim. Similarly the inner edges 28 of the walls 24 and 25 are reversely curved and the extent of the curvature is such that the inner end of the edge 26 lies in the plane of the outer face of the rim leg 11. The entire edge 26 is thus offset outwardly of the wheel rim. By this means the outer ends of the lugs 5 and 6 act on different laterally spaced portions of the ground engaged by the wheel. A plate 8, shaped to conform to the edges 27 is welded or otherwise secured to the walls 24 and 25.

Having thus described my invention what I claim and desire to protect by Letters Patent is:

1. In combination with a tractor wheel having a rim, axially inner lugs extending radially from said rim and having base portions disposed flat against the rim, the said base portions extending substantially the full width of the rim and having forwardly and rearwardly extending portions formed with fastener-receiving openings, fasteners passed through said openings for securing the legs to the rim, the said lugs being spaced from each other circumferentially of the rim, axially outer lugs extending radially from said rim and having base portions disposed flat against the rim between the inner lugs in close contacting engagement with ends of the base extensions of the inner lugs, the outer lugs being inclined laterally to dispose them in offset relation to the inner lugs, said outer lugs having portions projecting laterally from the rim and formed with side extensions in flat contacting engagement with the side face of the rim, and fasteners securing the said side extensions of the outer lugs against the side face of the rim.

2. In combination, an angle iron wheel rim having one leg forming a cylindrical wheel edge and the other leg extending radially inwardly from the outer edge of the first leg, a series of lugs spaced around said wheel rim and each having a base conforming in curvature to the cylindrical leg of the rim, said bases being fixed to the rim with their adjacent ends in spaced relation, a pair of lug walls extending outwardly from each base to meet at a ground engaging edge, the axially inner edges of said walls being perpendicular to the base and the outer edges reversely curved to offset the ground engaging edge axially inwardly, a second series of lugs having angled base portions with one leg of each base fitting between and contacting the ends of adjacent bases of the first series, the other leg of each angled base extending down along the second mentioned leg of the wheel rim and fixed thereto, each of the second series of lugs having front and rear walls meeting at a ground engaging edge, the side edges of these walls being offset axially outwardly to cause their meeting edge to lie wholly on the outer side of the plane of the second mentioned leg of the wheel rim.

ANDREW THEODOR FALTISEK.